(12) United States Patent
Parlato

(10) Patent No.: US 10,945,453 B2
(45) Date of Patent: Mar. 16, 2021

(54) AUTOMATIC MACHINE FOR STRAWBERRY DE-CALYX AND CUTTING IN PIECES

(71) Applicant: Giovanni Parlato, Sant'Egidio del Monte Albino (IT)

(72) Inventor: Giovanni Parlato, Sant'Egidio del Monte Albino (IT)

(73) Assignee: PND Costruzioni Elettromeccaniche s.r.l., Scafati (IT)

( * ) Notice: Subject to any disclaimer, the term of this patent is extended or adjusted under 35 U.S.C. 154(b) by 577 days.

(21) Appl. No.: 15/545,707

(22) PCT Filed: Dec. 3, 2015

(86) PCT No.: PCT/IT2015/000292
§ 371 (c)(1),
(2) Date: Jul. 23, 2017

(87) PCT Pub. No.: WO2016/088149
PCT Pub. Date: Jun. 9, 2016

(65) Prior Publication Data
US 2018/0077963 A1    Mar. 22, 2018

(30) Foreign Application Priority Data

Dec. 5, 2014  (IT) .................. RM2014A000708
Nov. 30, 2015 (IT) .................. 102015000078045

(51) Int. Cl.
*A23N 15/02*   (2006.01)
*B26D 3/26*    (2006.01)
*B26D 1/34*    (2006.01)

(52) U.S. Cl.
CPC ............... *A23N 15/02* (2013.01); *B26D 3/26* (2013.01); *B26D 1/34* (2013.01); *B26D 2210/02* (2013.01)

(58) Field of Classification Search
CPC .......... A23N 15/02; A23N 15/04; A23N 4/14; A23N 1/003; A23N 4/04; A23N 4/06;
(Continued)

(56) References Cited

U.S. PATENT DOCUMENTS

| 3,269,441 | A | * | 8/1966 | Anderson | ............... | A23N 4/14 |
| | | | | | | 99/491 |
| 4,884,696 | A | * | 12/1989 | Peleg | ....................... | B07C 5/00 |
| | | | | | | 209/545 |
| 5,590,591 | A | * | 1/1997 | Kim | ........................ | A23N 4/12 |
| | | | | | | 99/472 |

FOREIGN PATENT DOCUMENTS

JP         5366165 B1 * 12/2013
WO   WO-2014170923 A2 * 10/2014

OTHER PUBLICATIONS

English translation of JP-5366165-B1 (Year: 2013).*

* cited by examiner

*Primary Examiner* — Ibrahime A Abraham
*Assistant Examiner* — Chris Q Liu
(74) *Attorney, Agent, or Firm* — Patshegen IP LLC; Moshe Pinchas

(57) ABSTRACT

This invention refers to an automatic machine for strawberry processing to de-calyx and remove the leaves and cut in pieces; it is used in the agro-alimentary industry, in processing industry and in canning industry; and it could be suitable also for processing of other products similar to strawberry. The machine is composed of a conveyor belt (1) at closed loop design, where one or more operators feed manually in vertical with the leaves and the calyx up in the holes (5) of each fruit-holder element (3) of the conveyor belt which moves continuously to bring the fruits, so placed, to the processing station composed of a frame where a header plate (14) reciprocates in horizontal and vertical, controlled and
(Continued)

Figure 1:
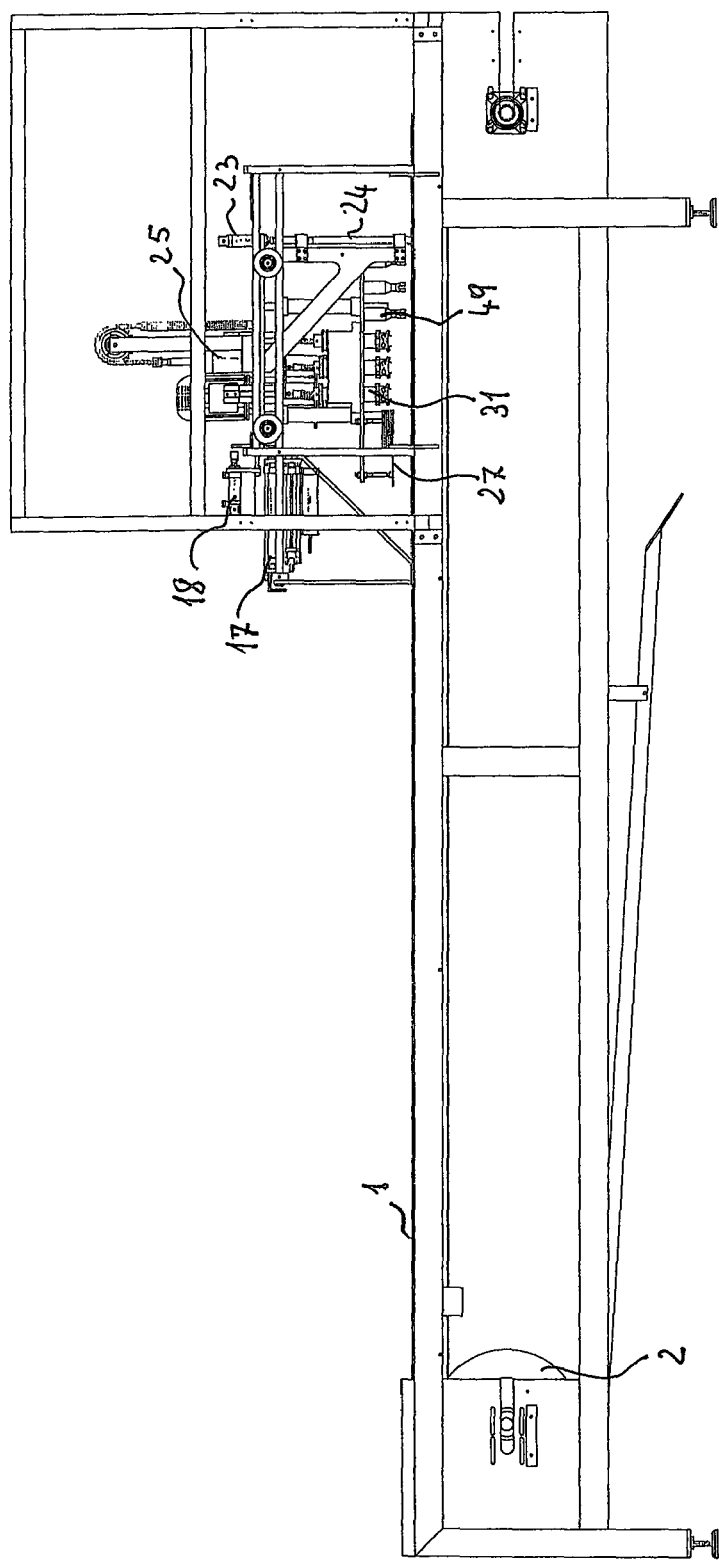

adjusted by sensors which lead the three processing operations done by the machine: strawberries alignment, de-calyxing and fruit ejection. In particular, the de-calyxing takes place through two cutting units (30) side by side composed of six rotating spindles (31) each one equipped with a rotating cutting head composed of two blades (32), optimized in their conformation and size, and wherein the opened tips penetrate to a adjusted depth, on the strawberry, around the calyx, and then close, during the penetration and the cutting, so to eliminate precisely the calyx with a minimum of straw berry fruit.

11 Claims, 11 Drawing Sheets

(58) Field of Classification Search
CPC ... A23N 4/08; A23N 4/12; A23N 7/02; A23N 15/08; B65B 7/28; B65B 5/04; B65B 25/04; B26D 3/26; B26D 1/34
USPC ......... 99/643, 549, 635, 637, 640, 491, 544, 99/564, 642, 472, 489, 542, 543, 545, 99/546, 550, 552, 557, 559, 561, 562, 99/565, 591, 636, 639, 641, 496, 537, 99/538, 540, 584, 589
See application file for complete search history.

US 10,945,453 B2

AUTOMATIC MACHINE FOR STRAWBERRY DE-CALYX AND CUTTING IN PIECES

TECHNICAL FIELD

This invention refers to an automatic machine for strawberry processing to de-calyx and remove the leaves, if required to cut the strawberry in pieces. It can work in the agro-alimentary industry, in processing industry and in canning industry, and it could be suitable also for processing of other products similar to strawberry.

STATE OF THE TECHNIQUE

On the market manual equipment for de-calyxing and cutting in pieces exists, in other words an operator with a tool similar to a caliper removes with a rotary movement the upper part, which includes the de-calyx and the leaves of the fruit, and then are placed in a machine which cuts them into pieces. These facilities involve long times and higher costs in equivalent production by automatic machines. These equipment are very slow in the processing and high costs comparing to the production had with automatic machines. Very common are also automatic machines which process great strawberry quantity and use systems with depression and blowing to keep and place the strawberry in right way in the cutting place of de-calyx, as per patent U.S. Pat. No. 3,952,646 at name of Evan Leban, or just the depression to keep strawberry as per patent WO 2014170923 at name of Turatti srl.

One of the disadvantages that occur in these machines is that the de-calyx cutting and leaves removing is quite deep in the strawberry, so that a considerable part of the fruit is removed.

As known to the applicant an automatic machine, simple to use, and able to have a relevant production per hour, obtaining a high yield with little or no waste and completely safe for the operator in charge, that is not using the air in pressure or depressure, is not present on the market.

Purposes and Advantages of the Invention

Purpose of this invention is to propose an automatic machine, having a plane continuous motion in which whole fruits are placed and positioned manually, then automatically and in succession, in a fast and accurate way, are first aligned at the same height, on said plane, to be cut on the top removing the calyx and the leaves with a special cutting unit, and then, if required, cut into pieces.

Another purpose of this invention is to provide a machine with a cutting station in which the tip of the blades, optimized in their dimensioning, are placed wide apart as much as they can sink on the strawberry around the calyx, and then close during the cutting, so to remove precisely the calyx with a minimum of strawberry fruit.

DESCRIPTION OF THE DESIGNS AND WAY TO REALIZE THE INVENTION

Figure 2:
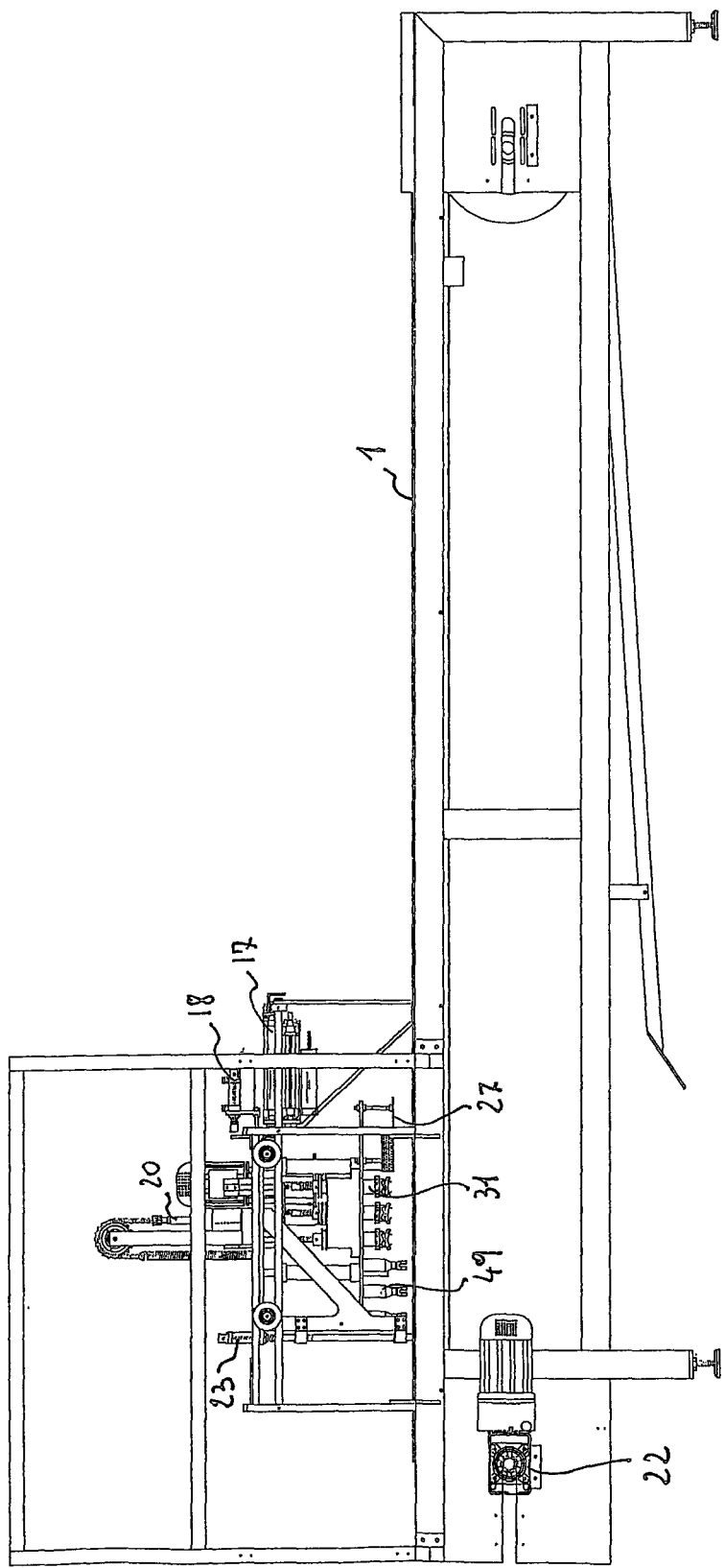
Figure 3:
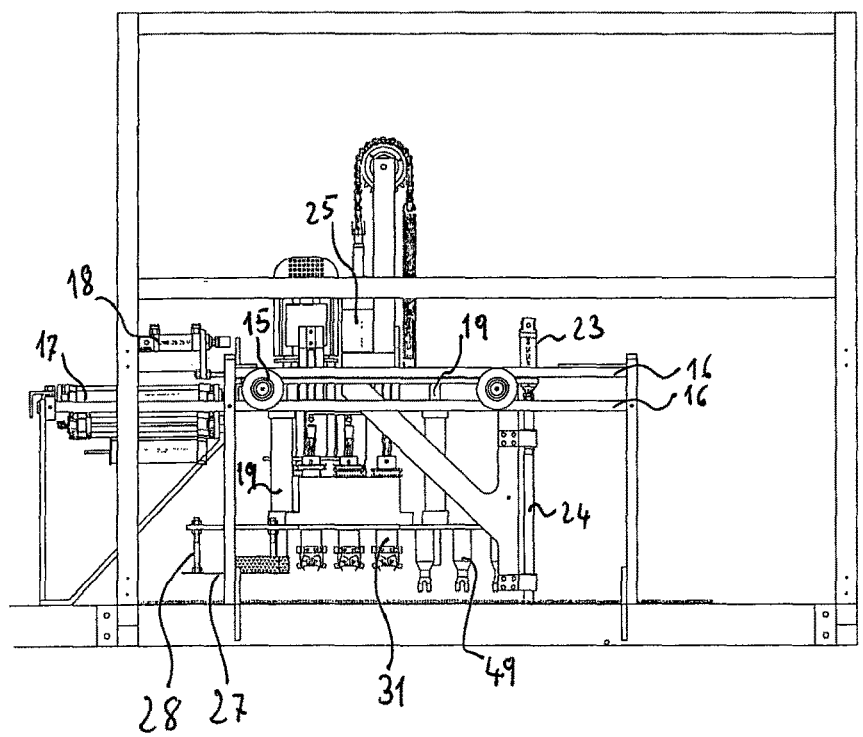
Figure 4:
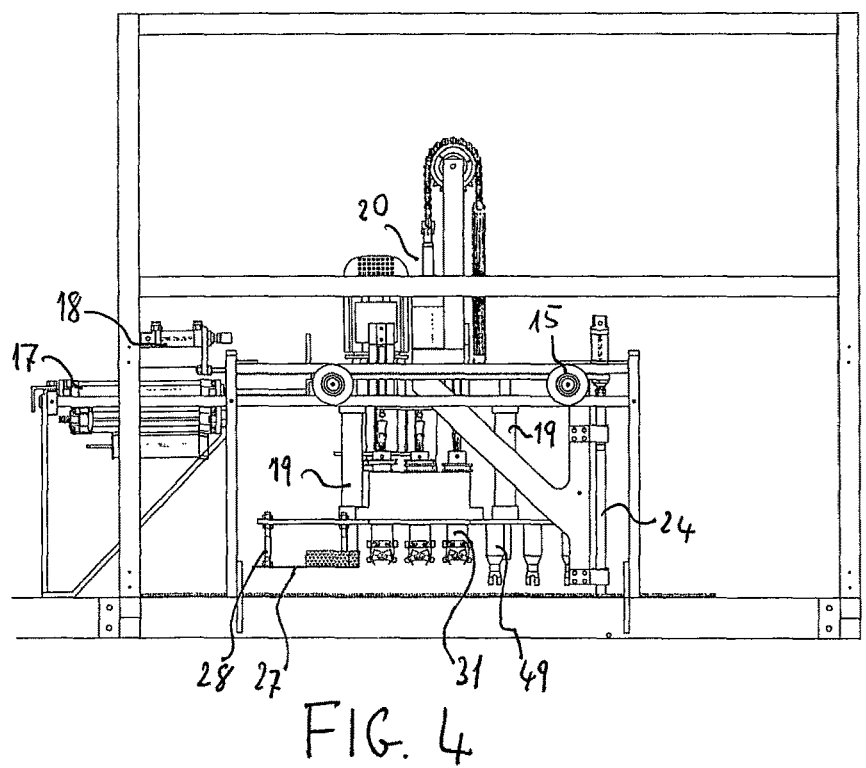
Figure 5:
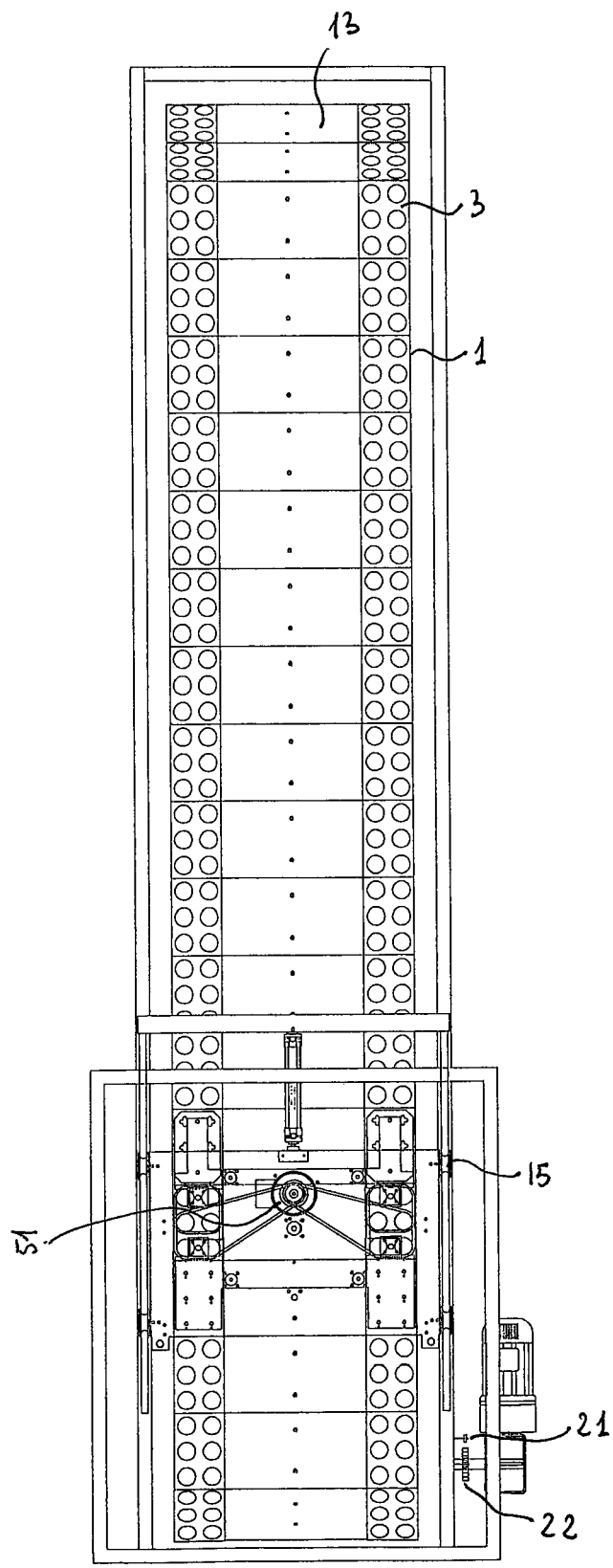
Figure 6:
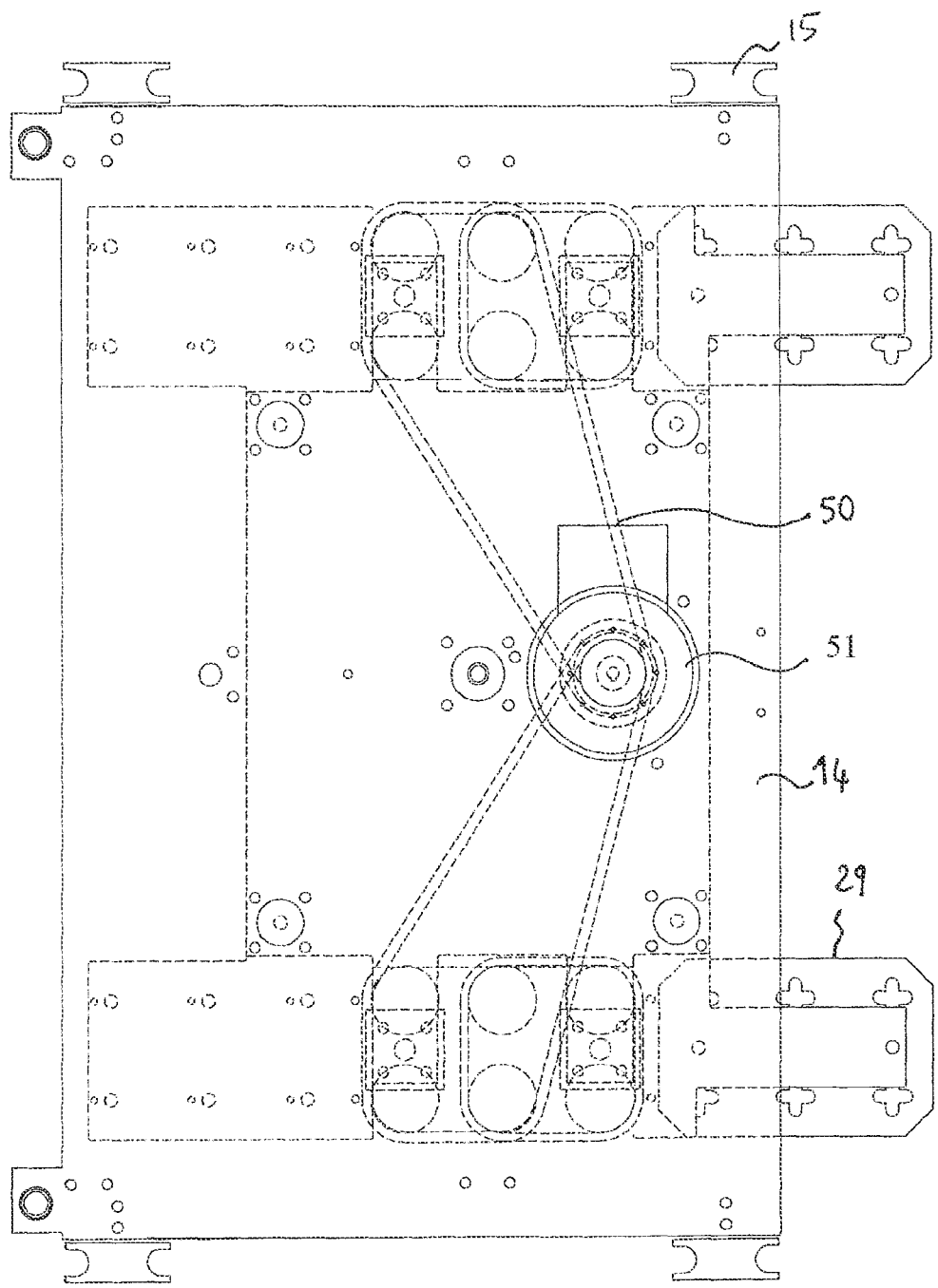
Figure 7:
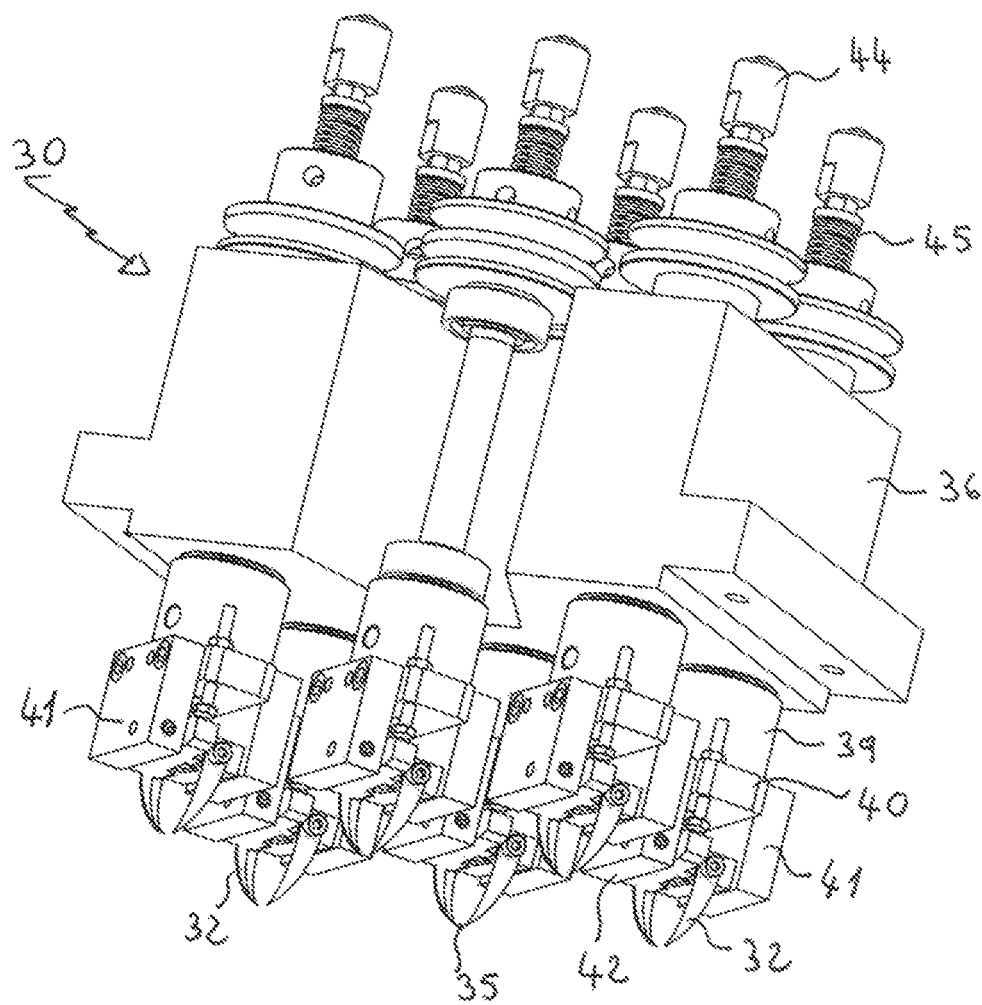
Figure 8:
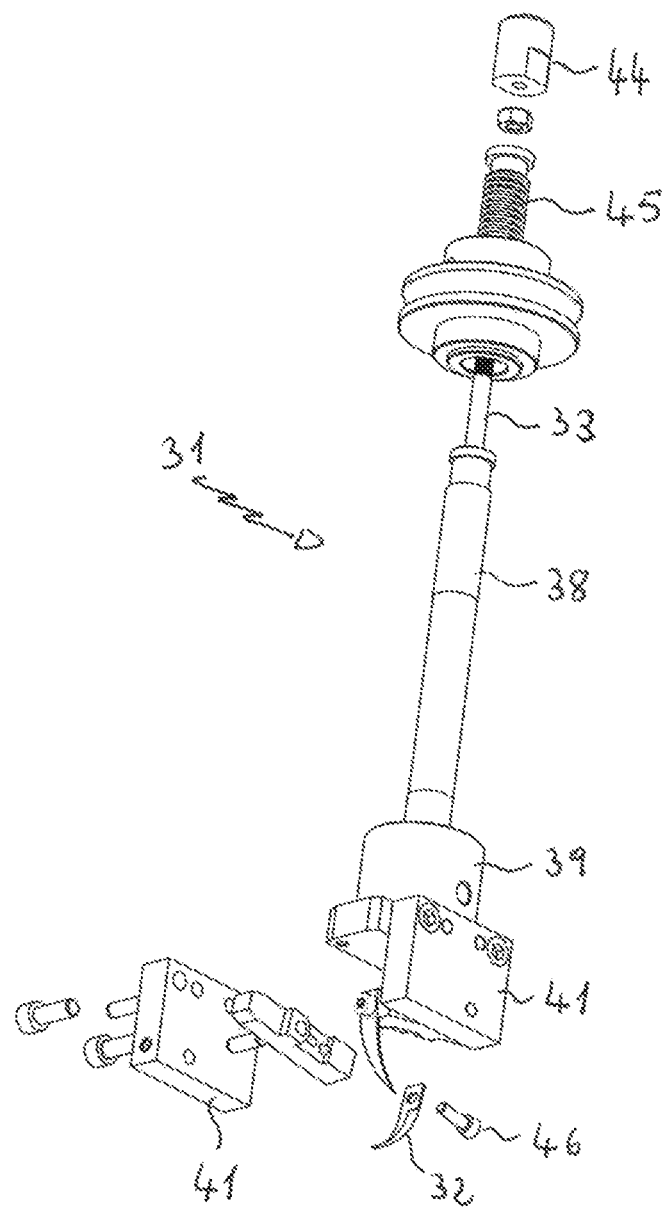
Figure 10:
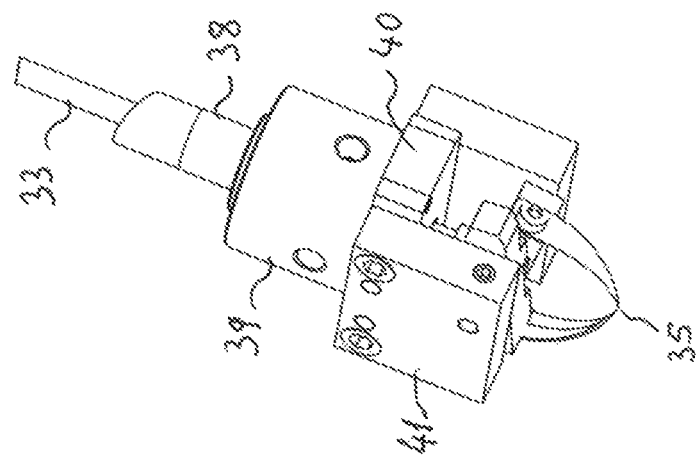
Figure 9:
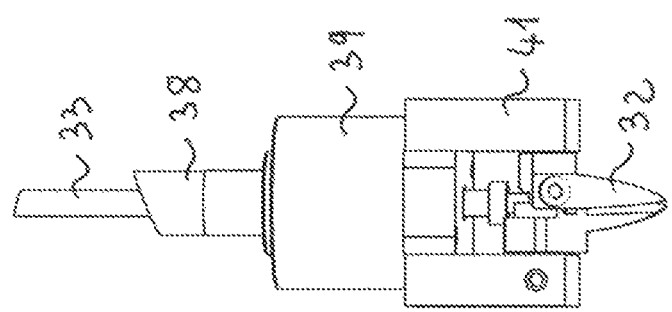
Figure 11:
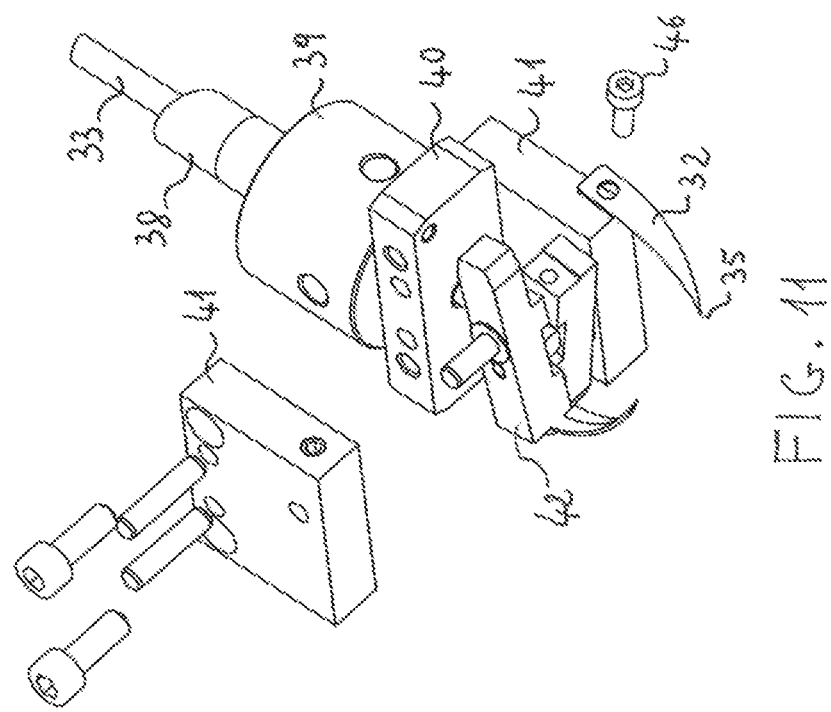
Figure 13:
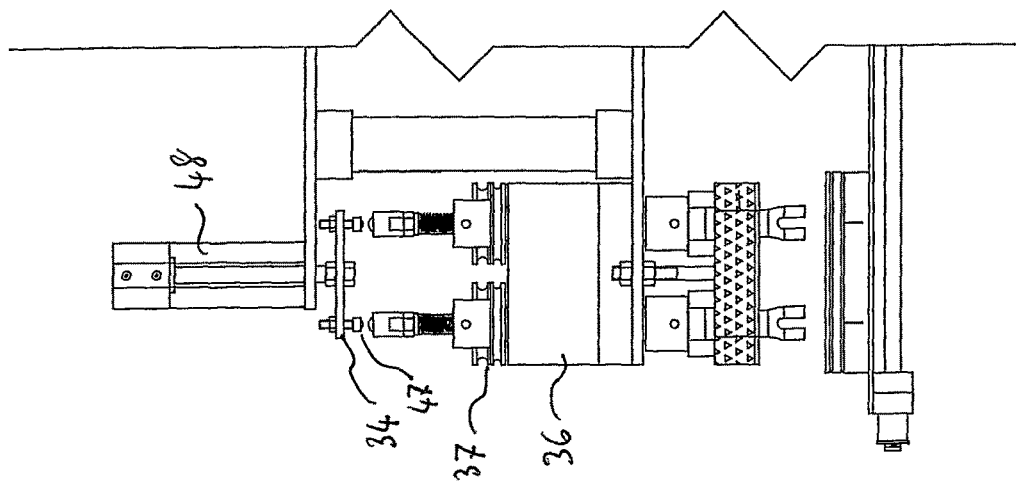
Figure 12:
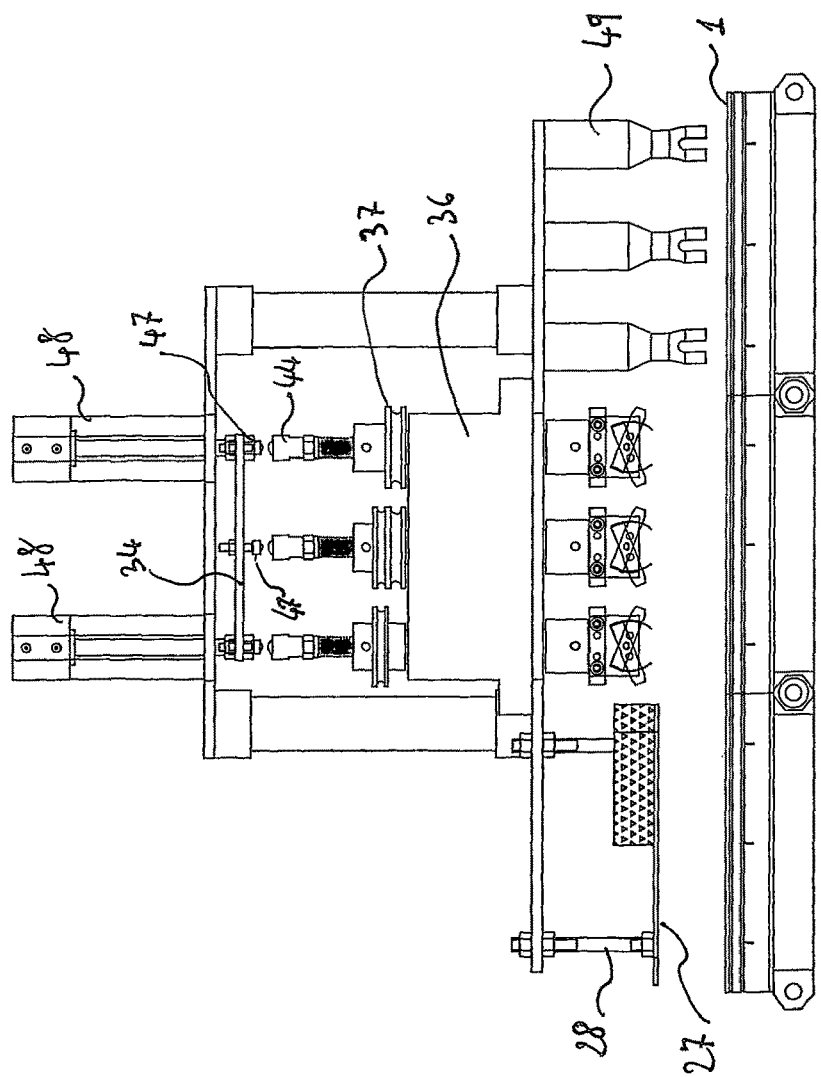
Figure 14:
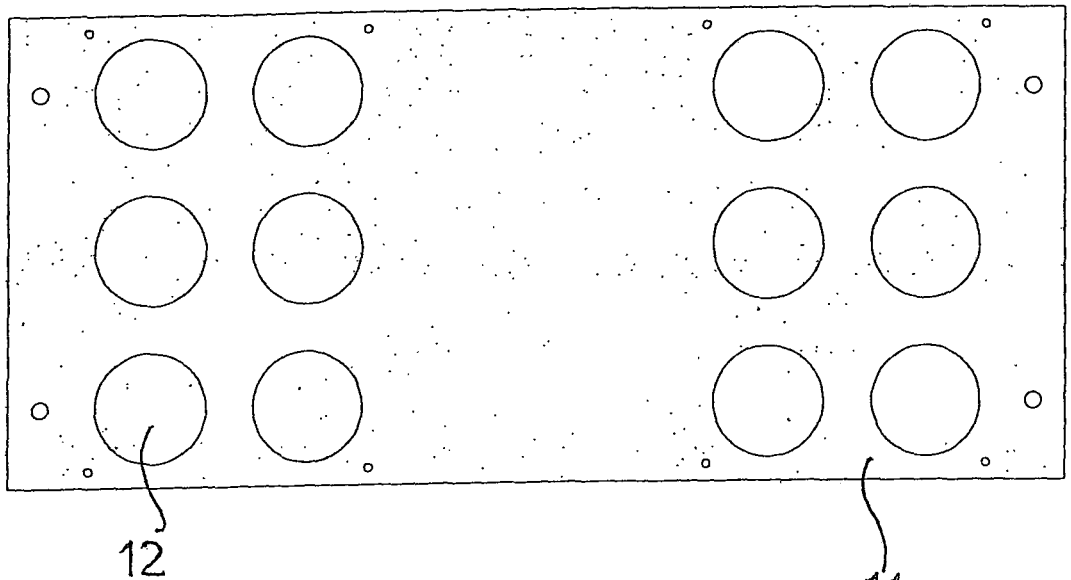
Figure 15:
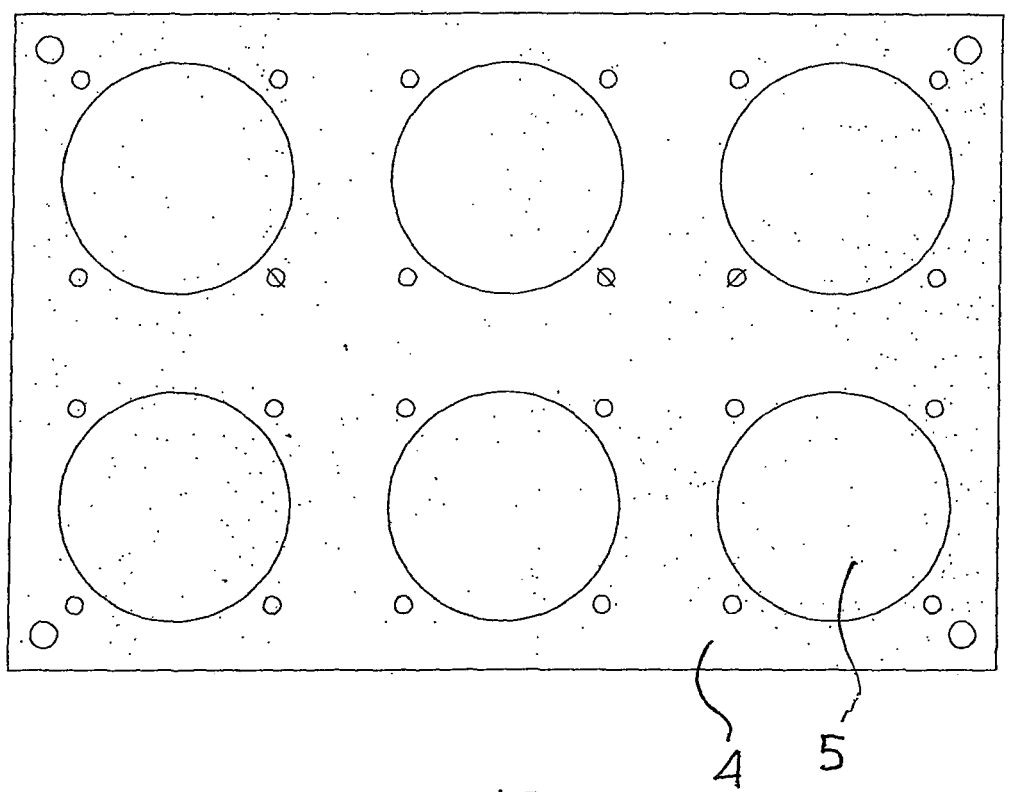
Figure 16:
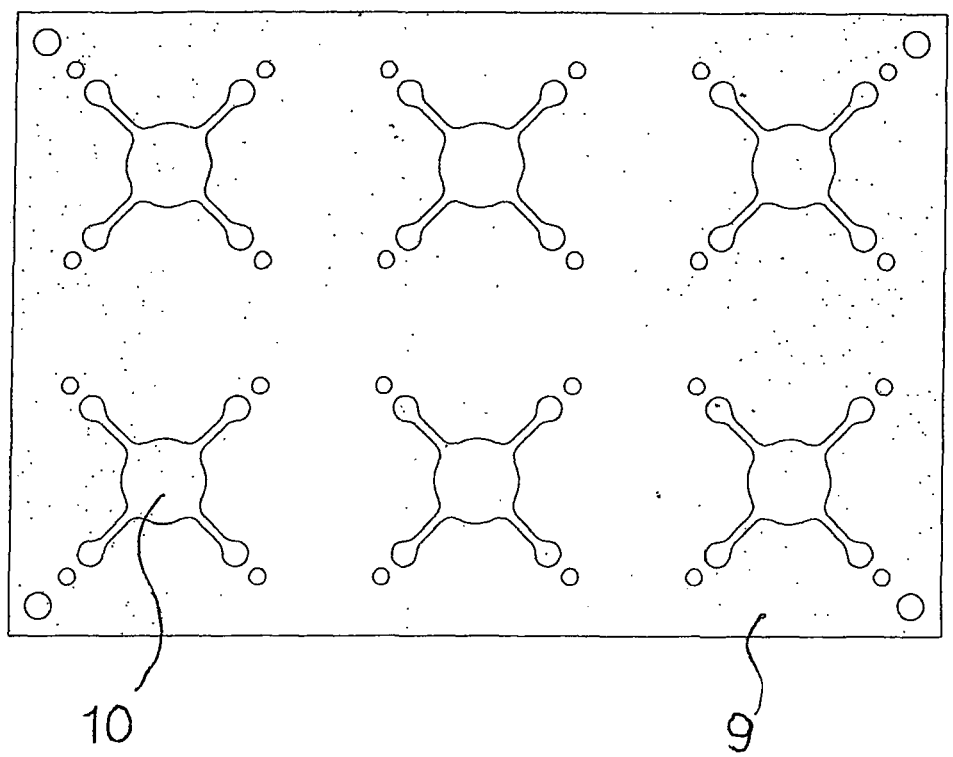
Figure 17:
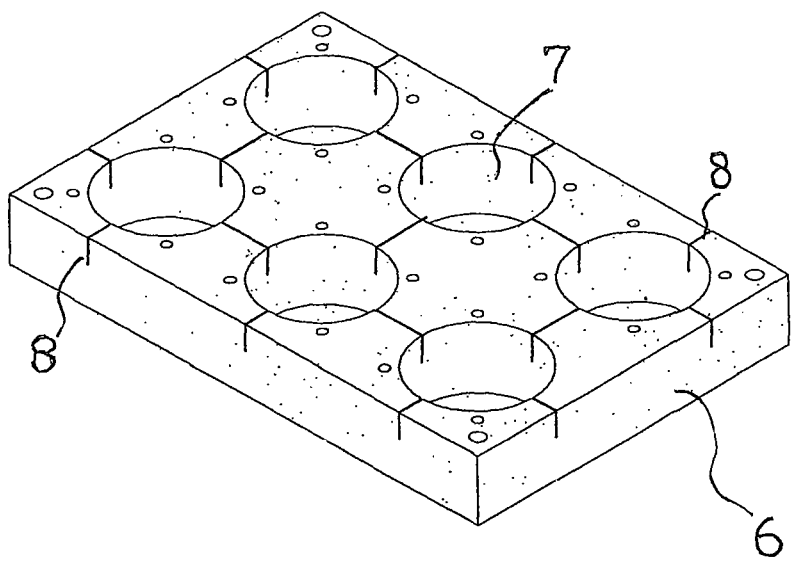

These and other characteristics as well as advantages will ensue clear thanks to the following description and from the enclosed designs furnished just as an indication, in which:

FIG. 1 is a right side view of the machine as a whole;
FIG. 2 is a left side view of the machine as a whole.
FIGS. 3 and 4 partial side views of the machine in two working phases.
FIG. 5 is a top view the machine as a whole.
FIG. 6 is a side view of the machine head as a whole.
FIG. 7 is a perspective view of the cutting unit as a whole.
FIG. 8 is an exploded viwe of a spindle as a whole.
FIG. 9 is a side view of the spindle head with the cutting blades.
FIG. 10 is a perspective view of the spindle head with the cutting blades.
FIG. 11 is an exploded view of the spindle head with cutting blades.
FIG. 12 is a side view of the components of the cutting station.
FIG. 13 is a side view of the components of the cutting station.
picture 14 shows the upper plate of the fruit-holder.
FIG. 15 shows the lower plate of the fruit-holder support.
FIG. 16 shows the membrane of fruit-holder.
FIG. 17 shows the polymer plate with slots.

As per drawings, the machine, subject of the present invention, is composed of a conveyor belt (1) at closed loop design, moved continuously by a wheel driving system (2) and adjustable speed motor. The belt (1) is equipped with staves composed of a sequence of rectangular metal plates (11), each provided with twelve holes (12). On each of these metal plates (11), in correspondence of their holes, are fixed, spaced apart and parallel, two fruit-holder units of parallelepiped shape with a rectangular base (3), each composed of an upper metal plate (4) with six holes (5), which overlaps a thick parallelepiped element in polymer (6) provided with six through holes (7) and each one provided in the rear face of the element (6), of slots (8) where cutting blades are inserted; between the element (6) and the top plate (4) is interposed a polymeric rectangular membrane (9) which is provided with six holes (10) especially shaped and made in the position that they can be at the holes (5), (7) and (12) once the single fruit-holder unit is composed and fixed (3). The belt (1) so composed, creates a corridor (13) placed between two spaced and parallel rows composed of a plurality of fruit-holder units (3).

Moreover, the machine includes a processing station composed of a frame where there is a plate head (14) which can move horizontally on the wheels (15) that slide on the tubular tracks (16), and can move vertically sliding on the guides (19) by the action of the two pistons (20).

The movement in horizontal and vertical is controlled and handled by sensors, practically a photocell reads the presence of strawberries, and synchronously a phase sensor (21), positioned on a star wheel (22) placed on the motor shaft controls a piston (23) which brings down two small pillars (24) that go to engage, on the side, with their lower ends, the conveyor belt in motion, making it integral with the head with the belt and making sure that the upper head moves in horizontal synchronously with the belt in its direction of movement.

As soon as the upper head starts the horizontal translation, it disengages from a sensor (26) which gives the signal for the vertical descent. Once the head reaches below the limit point, a sensor controls the upward; back in the high position, a sensor controls the upstroke of the pillars (24) from the belt (1) letting them return to the starting position, by the action of the piston (17) mediated by the dampers (18). A sensor controls the horizontal translation of the head in its initial position waiting to begin the new cycle. A counterweight system (25) has been added to improve the control of the vertical movement of the head.

From the movement of the head, that goes up and down vertically and moves horizontally, it depends on the three processing operations done by the machine: strawberry alignment in height; de-calyx; expulsion fruit.

The strawberry alignment operation in height (as well as the two other further processing operations) is carried out when the head (14) is lowered and with it two metallic plates (27) fixed on it; the plates (27) are placed side by side, horizontal and parallel to the plane of conveyor belt (1) below, and are adjustable in height, with respect to said plane (1), acting on the threaded rods (28) which support them together to the shelves (29).

The machine is able to de-calyx the strawberries through two groups (30) places side by side, each composed of six spindles (31) each of that provided with a cutting head with two rotating blades (32), which by the action of a rod (33) to which are connected, pushed axially from above, for the lowering of a plate (34), progressively close, reducing the distance between their tips (35), during the penetration in the strawberry and during the time of the calyx removing; then the spindles (31) and the rod (33) both come up to the initial position.

Each group (30) is composed by a unit (36) with six through holes where the six spindles (31) are placed and put in rotation by the pulleys (37) connected to the tubular rod (38) and below to the cylinder (39) and to the support plate (40) of the side plates (41).

At the lower part each of the cutting spindles (31) are composed of two supporting beams (42) placed side by side and parallel and pivoted to the side plates (41) so as to achieve the fulcrum of their opposite and specular rotation movement, being connected through orthogonal pins (43), the lower end of the pushing rod (33), whose upper end is provided with a ball head (44) which holds a spring (45).

At the end of each supporting beam (42) is fixed, by a screw (46), a cutting blade (32), so that the two blades (32) are opposite and specular and slightly misaligned, longitudinally, between them.

Each blade (32) has a curved shape in longitudinal side view, according to an circle arc, and in plan is strongly tapered and ends with a tip (35). The linear distance between the tips (35) of the two blades (32) is adjustable and, in not-cutting position, has a maximum gap of 23.5 mm and the minimum gap is 0 mm; the circular arc bend of the blade (32) is 26 degrees.

Each unit (30) is topped by a plate (34) made with six struts (47), everyone placed on the top of a ball head (44) at the upper side of the spindles (31); the plate (34) moves down to push the axles (33) down and lifts vertically actuated by two pneumatic cylinders (48). Each spindle (31) is driven in rotation by belts (50) connected to an electric motor (51).

The strawberry de-calyx operation (as well as the other two processing operations) is done when the head goes down, and works as followings:
one o more operators take strawberries from the central aisle (13) and feed manually in vertical with the leaves and the calyx up in the holes (5) of each fruit-holder element (3) of the conveyor belt which moves continuously to bring the fruits, so placed, to the processing station where they meet firstly a leveling mechanism, composed of two plates (27) that going down give a sized and adjustable pressure on the two fruit-holder element (3), and so on all the fruits placed in the holes, so to push further and vertically the strawberries in the holes, through the membrane (9) that keep them just a bit so to help the right placing in vertical, so that the height of the strawberry top is that one determined in referring to the bearing plane and such that the further cutting device is able to remove calyx and leaves and decrease the waste at minimum.

An advantage of this machine with respect to those proposals, is that the cut depth on the strawberry can be adjusted during the strawberries alignment phase through the adjustment of the descent depth of the plates (27) on the fruit-holder elements and the de-calyxing takes place through rotating blades, with an optimized shape and inclination of the blades, which allow to remove the calyx root decreasing the loss of product at maximum.

Arriving to the cutting station the two groups (30) are lowered by as much as the blades skim strawberries but do not touch them, an almost simultaneous command causes the plate (34) is lowered shutter by pushing the rods (33) toward down so that the pairs of blades close, and the tips penetrate the strawberry around the calyx and maintain their cutting rotation; then the plate (34) is raised, making progressively re-open the blades to the initial position; the result is a perfect cut of the calyx only for strawberry of any size and hardness.

The ejection operation of the fruit is performed through two groups of plungers places side by side, each including six cylindrical elements (49) in polymeric material, connected to the upper head (14) and by it dependent as per the vertical movement; each is formed at the lower end with notches so that when it is lowered to meet the strawberry face to push it down through the fruit holder, engages the knives for cutting, if in the slots (8) of the unit (6) have been placed the cutting blades, at two or at four blades, according to the pieces you want to have.

The de-calyxed fruits fall down below to the upper section of the conveyor belt on a small discharge belt, while the calyx and the leaves fall laterally to the machine.

The machine is made in stainless steel and the parts in contact with the product are in food approval materials.

The unit can be effectively integrated into a compact line for strawberry processing, which includes washing, disinfecting and drying.

The invention claimed is:

1. An automatic machine for strawberries calyx and leaves removing and strawberry pieces cutting, the machine comprising:
   a conveyor belt having a central corridor and a sequence of fruit holder units disposed on sides of the central corridor, said fruit holder units are configured to place therein strawberries with calyx and leaves facing upwards, said conveyor belt is configured to move in continuous motion to displace the strawberries forward;
   a processing station for vertical height alignment of strawberries, de-calyx and fruit ejection, said processing station is configured to reciprocate in horizontal and vertical direction with respect to said conveyor belt, said processing station includes:
      aligning plates for height alignment of the strawberries with respect to said fruit holder units, said aligning plates are configured to allow adjustment of descent depth of the plates on the fruit holder units so as to control cutting depth of de-calyx the strawberries,
      two units disposed side by side including six rotating spindles each of which being equipped with a rotating cutting head including two blades having a tip, said two blades are configured to move towards one another while penetrating the strawberries removing thereby calyx of the strawberries.

2. The automatic machine according to claim 1, wherein the fruit holder units are in parallelepiped shape with a rectangular base, each comprising:
an upper plate with six holes;
a polymer member provided with six through holes and slots for inserting therein cutting blades;
a rectangular polymeric membrane interposed between the polymer member and the upper plate and is provided with six holes.

3. The automatic machine according to claim 1, wherein the aligning plates are placed horizontal and parallel to the conveyor belt and are disposed on a threaded bars configured to allow adjustment of the descent depth.

4. The automatic machine according to claim 1, wherein said processing station further includes two groups of plungers placed side by side, each consisting of six cylindrical polymeric units configured for vertical movement towards said conveyor belt; each plunger is formed with notches configured to allow engaging knives for cutting said strawberries when the plunger is lowered towards a strawberry.

5. The automatic machine according to claim 1, that strawberry decalyx is realized when the two units bring the blades closes to the strawberry without touching the strawberry.

6. The automatic machine according to claim 1, wherein the cutting head of each unit is topped by a plate made with six struts, the plate is configured to displace the spindle up and down and is actuated by two pneumatic cylinders.

7. The automatic machine according to claim 1, wherein the spindles are rotated by pulleys connected to a tubular rod and to a cylinder.

8. The automatic machine according to claim 1, wherein the spindle is composed of two holding joists at a lower side of the spindle and are placed parallels and hinged to lateral plates so that they create a hub for opposite and specular rotation, and being connected, through orthogonal pins, to a lower side of a pushing rod, and to a ball head with a spring in an upper side of the spindle.

9. The automatic machine according to claim 8, wherein an end of each small holding joist is fixed, through a screw, to a cutting blade, so that the two blades are longitudinally opposite and specular, and slightly misaligned between the two blades.

10. The automatic machine according to claim 1, wherein each blade has a bended structure according to an arc of a circle and ends with a tip.

11. The automatic machine according to claim 1, wherein a linear distance between the tips of the two blades is adjustable; the linear distance between the tips of the two blades has a maximum gap of 23.5 mm and a minimum gap is 0 mm; and wherein a circular arc bend of the blade is 26 degrees.

* * * * *